United States Patent [19]

Lorenzana

[11] Patent Number: 5,195,463

[45] Date of Patent: Mar. 23, 1993

[54] BIRD BATHS AND COMBINATION HANGING AND PEDESTAL MOUNTINGS THEREFOR

[76] Inventors: Moises B. Lorenzana, 601 Lake Hinsdale Dr. Unit 310F, Willowbrook, Ill. 60514; Vance A. Lorenzana, 698 Springfield Cir., Naperville, Ill. 60540

[21] Appl. No.: 765,264

[22] Filed: Sep. 25, 1991

[51] Int. Cl.$^5$ .............................................. A01K 39/00
[52] U.S. Cl. ........................................ 119/77; 119/72; 119/52.2; D30/132; D30/123
[58] Field of Search ..................... 119/52.2, 52.1, 57.8, 119/77, 72, 69.5; D30/123, 124, 128, 132, 133

[56] References Cited

U.S. PATENT DOCUMENTS

| | | | |
|---|---|---|---|
| D. 271,434 | 11/1983 | Love | D30/128 |
| D. 277,988 | 3/1985 | Kilham | D30/121 |
| 727,597 | 5/1903 | Day | 119/77 |
| 825,382 | 7/1906 | Davis | 119/77 |
| 881,906 | 3/1908 | Cullen | 119/77 |
| 939,493 | 11/1909 | Gething | 119/77 |
| 1,010,543 | 12/1911 | Walter | 119/77 |
| 1,251,935 | 1/1918 | Stevens | 119/77 |
| 1,555,407 | 9/1925 | Ferris | 119/77 |
| 1,566,571 | 12/1925 | Appleton | 119/77 |
| 2,267,883 | 12/1941 | Wood | 119/77 |
| 2,591,459 | 4/1952 | Meany | 119/77 |
| 2,715,386 | 8/1955 | Jones | 119/52.2 |
| 3,125,069 | 3/1964 | Fowler | 119/77 |
| 3,372,676 | 3/1968 | Williams | 119/52 |
| 4,541,363 | 9/1985 | Paoluccio | 119/77 |
| 4,901,673 | 2/1990 | Overstreet | 119/77 |
| 4,938,168 | 7/1990 | Meidell | 119/77 |

FOREIGN PATENT DOCUMENTS

| | | | |
|---|---|---|---|
| 948570 | 9/1956 | Fed. Rep. of Germany | 119/77 |
| 14634 | of 1900 | United Kingdom | 119/77 |

OTHER PUBLICATIONS

Gardener's Eden.

*Primary Examiner*—John G. Weiss
*Attorney, Agent, or Firm*—James N. Videbeck

[57] ABSTRACT

An improved birdbath made of molded plastic is disclosed as including a generally circular water retaining tray portion having a central hub including thereon means for suspending the tray a hanger, and means on the hub for mounting a pedestal mounting thereto and supporting said tray portion from below. The means for suspending the central tray portion include a hook having a plurality of strands depending therefrom, with the distal ends of the strands matingly releaseably engaging the hub portion of the central tray. A threaded mounting in the central hub portion is adapted to mount thereon in inverse relation, a standard two liter refreshment bottle made of molded plastic. The strands are adapted to fit around the two liter bottle, and a mounting ring maintains the strands and bottle in a preferred orientation to each other. At the bottom of the central hub, a pipe mounting socket is adapted to be threadedly engaged by a ¾ inch I.P.S. pedestal. The socket includes plastic pads therein which are adapted for having threads cut therein by the insertion and rotation of a ¾ inch threaded pipe therein.

4 Claims, 3 Drawing Sheets

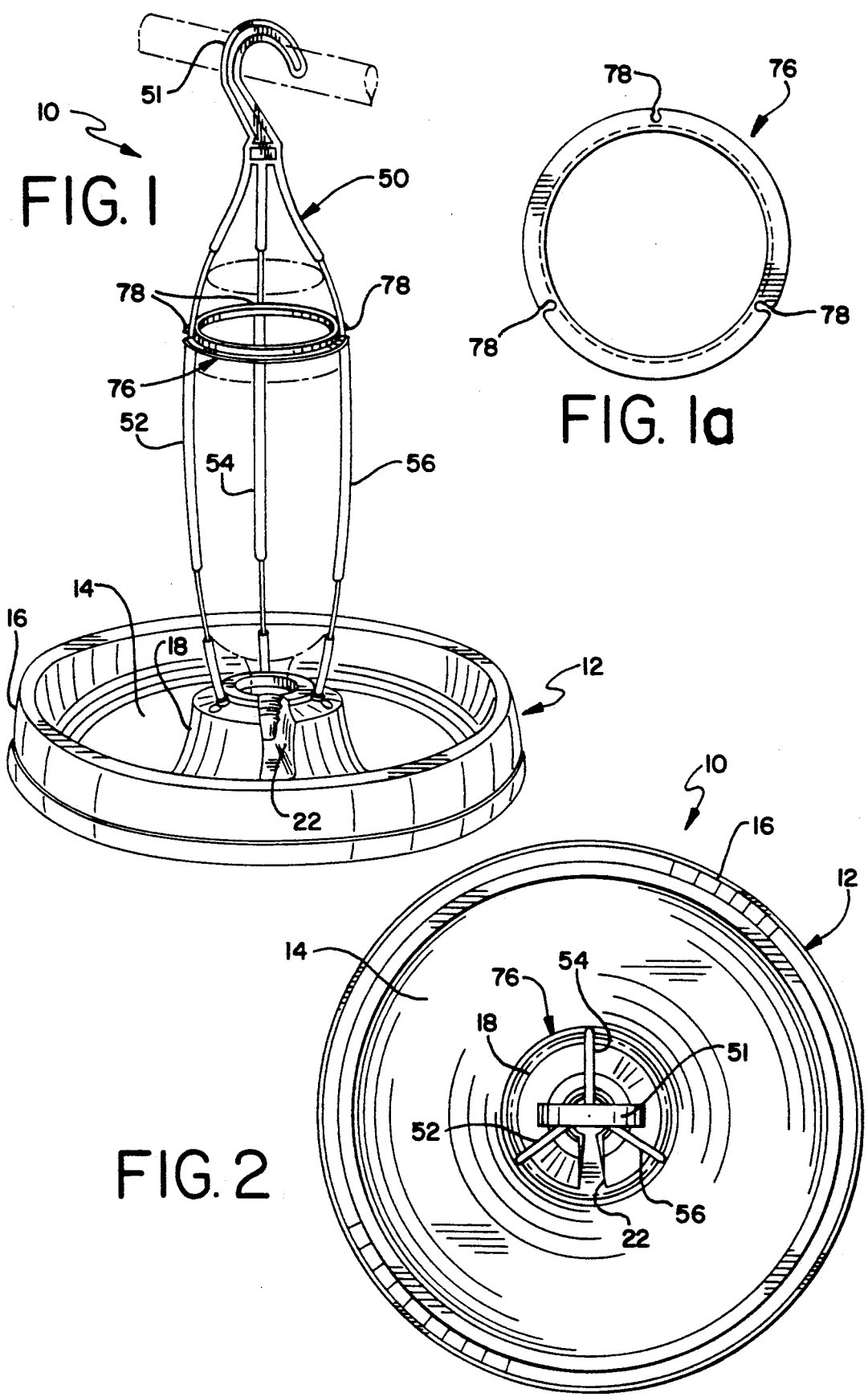

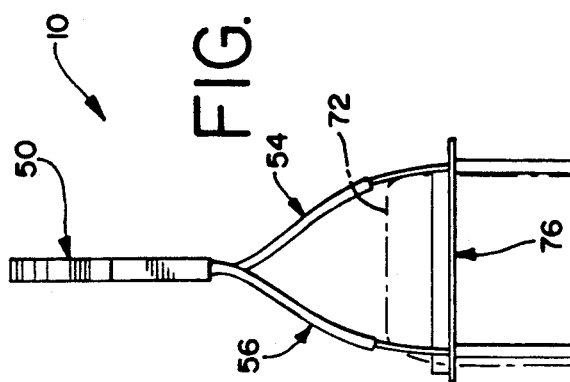
FIG. 4
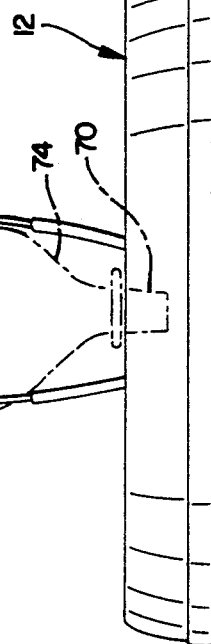
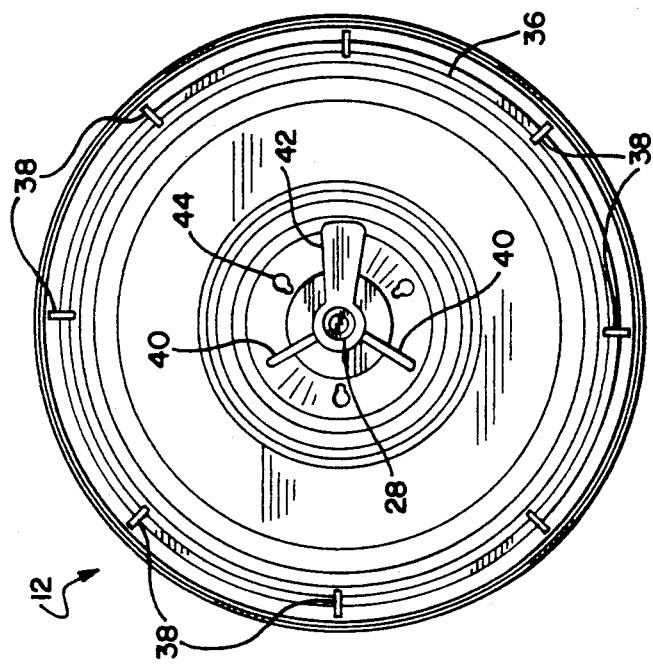
FIG. 5
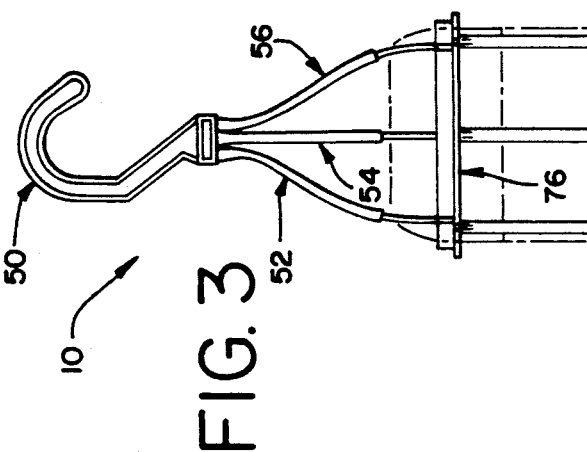
FIG. 3
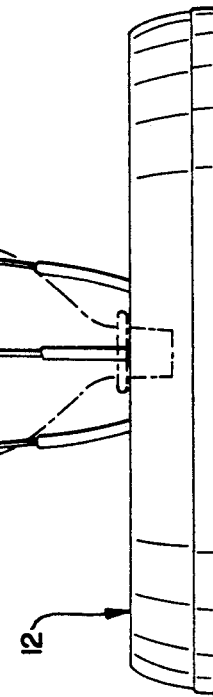

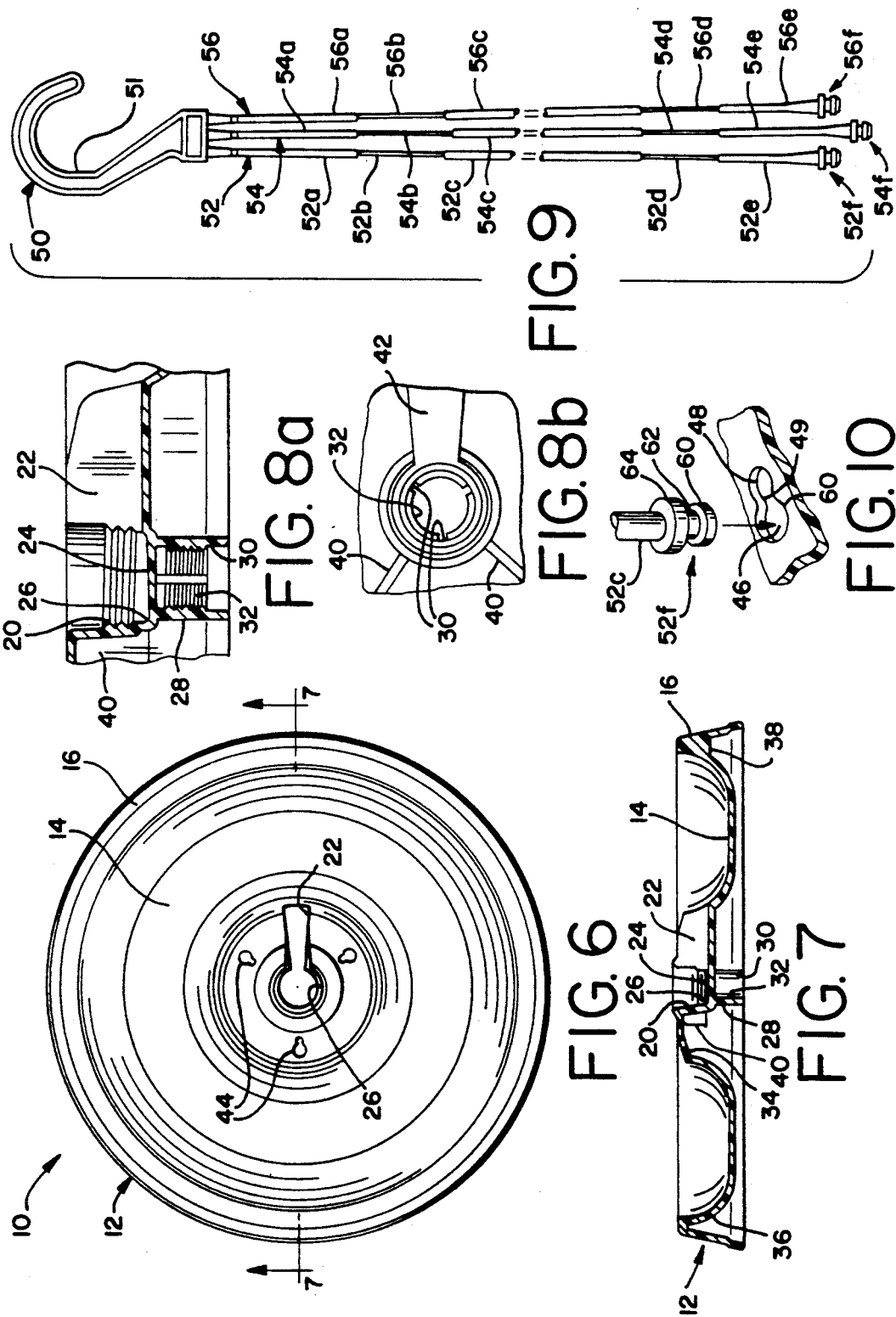

BIRD BATHS AND COMBINATION HANGING AND PEDESTAL MOUNTINGS THEREFOR

The present invention relates to bird baths or drinking fountains having a reservoir for retaining water and, more specifically, to such a single bird bath including provisions for both a pedestal mounting and a suspension type mounting thereon.

BACKGROUND OF THE INVENTION

Bird baths or drinking fountains are utilized to attract birds and other small animals to visible locations, usually in the yards of home owners in order that the home owners and guest may enjoy the presence of such wildlife. Generally, such baths or fountains, referred to generally herein as "bird baths," consist of a bowl or tray for retaining a quantity of water. However, such devices require frequent refilling. Other devices such as shown in U.S. Pat. No(s). 1,010,543, 1,252,935, and 1,566,571 all disclose bird baths which provide a separate reservoir for replenishing the water in the tray. In these devices, an elevated reservoir of water refills the tray through a port which is located at the desired water level of the tray. When the water level in the tray falls to a position near the upper edge of the port, a pressure differential between ambient air and a slight vacuum in the reservoir may draw a small quantity of ambient air into the reservoir through the port and displace a corresponding amount of water from the reservoir into the tray until a balanced condition results with the water level in the tray submerging the port.

Bird baths are normally designed for either suspension from an overhead member, such as the branch of a tree, or for mounting on a vertical member such as a metal post. Heretofore, a single such device has not been adaptable for mounting using both of the foregoing configurations.

Bird baths which have elevated reservoirs present certain problems when they are suspended from an overhead member such as a tree branch because the weight of the water in the elevated reservoir raises the center of gravity of the device above the upper portions of the tray. Previous efforts to suspend bird baths having an elevated reservoir have utilized preshaped metal parts which contribute a substantial amount of additional weight to the bird bath and are expensive to manufacture. It would be desirable to provide a single bird bath configuration which may be mounted either on top of a pedestal or suspended from an elevated member. Furthermore, it would be desirable to provide an inexpensive bird bath having a simplified and inexpensive means for mounting same on a pedestal, and suspending it from an elevated member.

SUMMARY OF THE INVENTION

Briefly, the present invention is embodied in a bird bath having a tray, the tray having a web portion and an outer upwardly extending ridge for retaining water within the tray. The tray includes a means for mounting same on the top of a vertical post and also includes a suspension means for hanging the tray from an elevated member such as the branch of a tree, overhead beam, or the like.

In the preferred embodiment, the tray has a centrally located retaining means for retaining the mouth of an inverted reservoir and a passage for permitting the flow of fluid from the reservoir to the tray. The suspension means includes a hook and plurality of strands of material joined to the hook for suspension from the bottom thereof. Each of the strands includes at least one flexible portion and one relatively less flexible portion, and a central strand is longer than the outer strands. The strands are adapted to extend outwardly and downwardly from the hook, along the sides of the reservoir retaining same between the strands, and then attaching at their respective distal ends to the tray. The flexible portions of the strands are positioned to enable the strands to bend around the curved edges of the reservoir. A notched ring is also provided to extend horizontally around the reservoir, with each strand being retained in a notch in evenly spaced relation around the ring to secure the reservoir firmly between the strands.

BRIEF DESCRIPTION OF THE DRAWINGS

The present invention may be more clearly understood by a reading of the following detailed description of a preferred embodiment taken in conjunction with the accompanying drawings in which:

FIG. 1 is an perspective view of a bird bath constructed in accordance with the present invention, shown in its suspension mode with an overhead member and a reservoir shown in phantom line;

FIG. 1a is a detail top plan view of the strand retaining ring shown in FIG. 1;

FIG. 2 is a top plan view of the bird bath shown in FIG. 1;

FIG. 3 is a side elevational view of the bird bath shown in FIG. 1,

FIG. 4 is a second side elevational view of the bird bath, taken 90° from the elevation shown in FIG. 3;

FIG. 5 is a bottom view of the bird bath tray;

FIG. 6 is a detail top plan view of the bird bath tray;

FIG. 7 is a cross sectional view taken substantially along line 7—7 of FIG. 6;

FIG. 8a is an enlarged fragmentary detail sectional view of the hub shown in FIG. 7;

FIG. 8b is an enlarged fragmentary detail view of the bottom of the hub shown in FIG. 5;

FIG. 9 is a detail elevational view of the hook and strands used to suspend the bird bath; and, FIG. 10 is an enlarged fragmentary perspective view of the means for engagement between the strand and tray.

DETAILED DESCRIPTION OF THE PREFERRED EMBODIMENT

Referring to FIGS. 1, 2, 6, 7, 8a and 8b, a bird bath 10, constructed in accordance with the present invention, includes a generally circular tray 12 having an annular substantially horizontal web section 14 surrounded by an elevated ridge 16 such that water can be retained within the ridge 16 and above the web section 14, for providing water to birds or other animals. The tray 12 has a central elevated hub 18 having co-axial first and second bores 20 and 30, respectively, extending inwardly from the top and bottom of the hub, respectively to a central horizontal wall 24 separating the bores. A common two liter plastic bottle 68 forms a vacuum sealed reservoir when filled with water, inverted and mounted in first bore 20, as the water is maintained in the reservoir by a vacuum, the water stays fresh and unspoiled, even after substantial periods of time.

A slot 22 extends inwardly from the outer perimeter of the hub 18 to and in fluid communication with threaded bore 20, and in the preferred embodiment the bottom horizontal wall 24 of the threaded bore 20 extends horizontally as a bottom wall of slot 22. The elevation of the web section 14 is slightly below that of the horizontal wall 24. A rounded corner 26 defines a joinder between the bore 20 and the bottom wall 24 and provides for an air gap of at least about ⅜ inch between the bottom mouth 70 (FIG. 4) of a reservoir 68 and wall 24.

Referring to FIGS. 8a and 8b, a tubular portion 28 extends perpendicularly downward from the underside of the bottom wall 24 coaxially with the threaded bore 20. In the preferred embodiment, the bore 30 of the tubular portion 28 is adapted to receive the distal end of a threaded ¾ inch I.P.S. pipe. Radially inwardly of bore 30, a plurality (3 in this embodiment) of raised arcuate segments 32—32 having spaces 30a—30a therebetween provide a self threading capability to the bird bath. When the tubular section 28 of the tray 12 is positioned over the distal end of a vertical threaded ¾ inch I.P.S. pipe (not shown), the threads of the pipe will cut complimentary threads on the raised arcuate segments 32—32 and the chips or shavings (not shown) will be deposited in the spaces 30a—30a from which they may fall outwardly of the tubular portion 28.

Referring to FIG. 5, the bottom of the tray 12 includes a generally annular recess 34 positioned radially outwardly of and around tubular portion 28 and is complementary to the elevated hub 18. Similarly, adjacent the outer edge 37 of the tray 12 an annular groove 36 extends therearound and is complementary to the raised ridge 16 on the topside of the tray. A plurality of strengthening webs 38—38 span the groove 36 and join the underside of the web section 14 to the outer edge 37 of the tray 12 to add rigidity thereto. Additionally, the central tubular section 28 is braced to the under portion of the tray 12 by a pair of bulkheads 40—40 which span between the annular recess 34 and the tubular section 28, The underside 42 of slot 22 also adds rigidity to the hub of the tray.

As shown in FIGS. 5 and 10, three keyhole shaped apertures 44—44 are positioned in even spaced relation around the hub 18. As shown in FIG. 9, each hole 44 consists of a larger outer portion 46, a smaller inner portion 48 and between the two, a constricted neck 49. The constricted neck 49 serves to lock the foot portions 52f, 54f, 56f, respectively, of strands 52, 54, 56 into the inner portions 48—48 of apertures 44—44.

Referring to FIGS. 1-4, and 9, in order to suspend the bird bath 10 rom an elevated horizontal member such as a tree branch or the like (not shown) a suspension member generally indicated at 50 is provided having an upper hook shaped end 51. Attached to the bottom of the hook shaped end 51 in parallel relation to each other are three depending strands 52, 54, and 56. In this embodiment the center strand 54 has a slightly longer length than each of the other strands, 52, 56. Central strand 54 is longer than outer strands 52 and 56 because it bends farther around a bottle 68 when mounted therearound. The additional length maintains the tray 12 in horizontal position in a completed assembly 10.

Referring to FIG. 9, in one aspect of the present invention, while each of the strands 52, 54, 56 has a circular cross-section, the diameter of the cross-section is not constant over the length of the strands. Portions of the strands have an enlarged cross-sectional diameter and therefore these sections are relatively rigid whereas other portions have a reduced cross-sectional diameter and these sections are relatively flexible compared to the sections having enlarged cross-sections. Each of the strands 52, 54, 56 has an upper larger diameter portion 52a, 54a, 56a subjacent the hook shaped end 51. Extending immediately therebelow are first reduced diameter pliable portions 52b, 54b, 56b respectively, with portion 54b being longer than portions 52b and 56b. Central, relatively rigid portions 52c, 54c and 56c, respectively extend from respective ones of the first reduced diameter sections 52b, 54b, 56b, and second reduced diameter sections 52d, 54d and 56d extend from respective ones of rigid portions 52c, 54c, 56c. Enlarged diameter substantially rigid sections 52e, 54e, 56e, extend from the second reduced diameter sections 52d, 54d and 56d, respectively.

Referring to FIGS. 1-4, the strands 52, 54, 56 are of such length as to enable a conventional plastic two liter bottle 68 to be inserted upside down between the strands with the mouth 70 of the bottle threadedly engaged into complimentary threads in the bore 20. The rounded joinder 26 at the bottom of threaded bore 20 prevents the mouth 70 of the plastic bottle 68 from sealing against the bottom wall 24. At least a ⅜ inch space will remain between the end of the mouth 70 of the bottle 68 and bottom wall 24 through which air may pass into the bottle, and water may pass outwardly along the bottom wall 24 of the slot 22 and into the web section 14 of the tray 12. The recycled use of the conventional liquid container 68 provides an efficiency which aids the environment rather than spoiling it.

The enlarged and reduced diameter portions of the strands 52, 54, 56 are positioned such that the upper first constricted portions 52b, 54b, 56b will bend around the elevated bottom 72 of an inverted bottle 68. The lower second constricted portion 52d, 54d, 56d are positioned to be adjacent the shoulder 74 of the bottle such that the relatively rigid central-sections 52c, 54c, 56c will extend along the sides of the bottle 68.

As can plainly be seen in FIG. 9, strand 54 is longer than strands 52 and 56. The extra length is needed because strand 54 extends from the center of the bottom of hook 51 around bottle 68 to tray 12. Since the outer strands begin off of the bottle centerline, they have a shorter distance to extend around the bottle. The bottom of central strand reduced portion 54b and foot 54f extend downwardly from their neighboring strands so that those portions are positioned evenly vertically with like portions of the neighboring strands when all the strands are wrapped around a bottle 68. Therefore the tray 12 is retained in a horizontal position (it is not tilted), and the ring 76 rests horizontally on the top of the strand central portions 52c, 54c and 56c.

At the bottom end of each of the three strands, 52, 54, 56, is a foot 52f, 54f, and 56f, respectively. As can be seen in FIG. 10, the foot 52f, which is representative of each of the feet, has an enlarged bulbous distal end 60 and above the bulbous end 60 is a narrower cylindrical shaft portion 62. Above the cylindrical shaft 62 is an enlarged annular ring 64. The bulbous end 60 has a diameter that will easily pass through the large outer portion 46 of each hole 44 on hub 18 and the cylindrical shaft portion 62 has a diameter slightly larger than the width of the constricted neck 49 between the larger and smaller portions 46, 48, respectively, of each hole 44. The upper annular ring 64 has a diameter sufficiently large to prohibit its passing through any portion of the hole 44, and the cylindrical shaft 62 is at least as long as the thickness of the plastic material in the area near each hole 44. The bulbous end 60 of the foot 52a can therefore easily pass through the larger outer portion 46 of the hole 44 until the annular ring 64 contacts the hub section 18. Thereafter, the cylindrical shaft 62 may be snapped through the constriction 49 and pass into the smaller inner portion 48.

Finally, a circular stabilizing ring 76 is provided having three equally spaced grooves 78—78 in the outer perimeter thereof. Each of the grooves 78—78 is sized so as to tightly fit around the bottom of the reduced portions 52b, 54b, 56b of the strands 52, 54, 56, with the tops of enlarged central portions 52c, 54c and 56c engaging the bottom surface of ring 76. Grooves 78—78 are constricted at the outer portion thereof so as to lock the reduced portions 52b, 54b, 56b therein similarly to the way that the strand foot portions lock into apertures 44—44. The diameter of the ring 76 is also sized to fit snugly over the bottom portion 72 of an inverted bottle 68 such that when the bottle is inserted between the strands 52, 54, 56, with the mouth 70 threaded in the base 20, the bottle 68 will be locked therein so that the entire bird bath assembly 10 will be stabilized, even in windy conditions. The combination of the ring 76, suspension member 50 and the tray 12 will not allow the bottle to tip relative to the strands 52, 54, and 56.

As can be seen from the foregoing, there is provided an improved bird bath having a tray and a reservoir of water for refilling the tray. Furthermore, the bird bath may be mounted on either the top end of a vertical tubular member, or suspended from an elevated member such as the branch of a tree. Furthermore, the parts of the bird bath 10 can be manufactured inexpensively with few parts and can be easily assembled. Finally, the parts may be sized such that the bird bath 10 can accept a readily available plastic bottle, such as a two liter bottle, as a reservoir.

Although the present invention has been described in relation to a single embodiment, one skilled in the art will appreciate that numerous variations and alterations of the invention can be made without departing from the true spirit and scope of the present invention. Therefore, it is intended by the appended claims to cover all such changes and modifications which come within the true spirit and scope of the invention.

What is claimed:

1. A bird bath comprising in combination:
a tray having a web portion and an outer ridge for retaining water within said tray,
retaining means centrally located in said tray for removably retaining a mouth of an inverted reservoir, and
said web portion having a passage therein permitting the flow of liquid from said reservoir to said tray,
mounting means adapted for mounting said tray on top of a vertical support member,
suspension means adapted for suspending said tray from an elevated member comprising a hook and a plurality of strands extending from said hook and engagingly retaining said tray, and
a ring adapted to surround a reservoir to secure said strands on said reservoir when said mouth of said reservoir is retained in said retaining means.

2. A bird bath comprising in combination:
a tray having a web portion and an outer ridge for retaining water within said tray,
retaining means centrally located in said tray for removably retaining a mouth of an inverted reservoir, and
said web portion having a passage therein permitting the flow of liquid from said reservoir to said tray,
suspension means adapted for suspending said tray from an elevated member comprising a hook and a plurality of strands extending from said hook and engagingly retaining said tray, and
a ring adapted to surround a reservoir to secure said strands on said reservoir when said mouth of said reservoir is retained in said retaining means.

3. A bird bath comprising in combination:
a tray having a web portion and an outer ridge for retaining water within said tray,
retaining means centrally located in said tray for removably retaining a mouth of an inverted reservoir, and
said web portion having a passage therein permitting the flow of liquid from said reservoir to said tray,
suspension means adapted for suspending said tray from an elevated member said suspension means comprising a hook and a plurality of continuous strands integral with said hook extending from said hook and engagingly retaining said tray, and
each said strand having at least one relatively rigid section and at least one relatively flexible section thereadjacent.

4. A bird bath comprising in combination:
a tray having a web portion and an outer ridge for retaining water within said tray,
retaining means centrally located in said tray for removably retaining a mouth of an inverted reservoir, and
said web portion having a passage therein permitting the flow of liquid from said reservoir to said tray,
suspension means adapted for suspending said tray from an elevated member comprising a hook and a plurality of at lest three strands integral with said hook extending from said hook and engagingly retaining said tray, and
said strands joined to said hook in parallel relationship to each other such that there are two outer strands and at least one inner strand, and said outer strands are shorter than said inner strand.

* * * * *